Patented Aug. 8, 1944

2,355,326

UNITED STATES PATENT OFFICE 2,355,326

PREPARATION OF HIGH MOLECULAR CELLULOSE DERIVATIVES

Siegfried Petersen, Leverkusen-Schlebusch, and Karl Taube, Leverkusen-I. G. Werk, Germany; vested in the Alien Property Custodian No Drawing. Application July 1, 1941, Serial No. 400,715. In Germany June 6, 1940

10 Claims. (Cl. 18—55)

The present invention relates to the preparation of high molecular cellulose derivatives and to the new products which are obtainable thereby.

In accordance with a known process halogenides of di- or polybasic acids are caused to react upon such cellulose derivatives as still contain free hydroxy groups. The said process results in the forming of a net work between the cellulose molecules. In consequence thereof, the cellulose derivatives become insoluble in organic solvents or at least only capable of being swollen thereby. The said prior known process is accompanied by the disadvantage that during reaction free hydrogen chloride is evolved which may have a breaking-down effect upon the cellulose derivatives. Moreover, in practice the prior known process can be performed only by contacting the ready made shaped articles from such cellulose derivatives either with a solution or with a vapor of carboxylic acid halogenides of the character described. If one would try to dissolve these starting materials in a common solvent they would enter into reaction spontaneously and the reaction product would be precipitated as an insoluble mass which is no longer capable of being molded or only with difficulty.

It is the object of our present invention to obviate these difficulties and to develop a new process which allows one to convert such cellulose derivatives into a higher molecular state, thus improving their stability towards heat and towards organic solvents, without affecting their capability of being molded. Other objects will be apparent from the following description and claims.

In accordance with our present invention esters, ortho-esters or acetals which contain several functional groups which are capable of undergoing a re-esterification or a re-acetalisation reaction at a temperature up to about 220° C. are caused to react at a higher temperature upon cellulose derivatives of the character described. The heating of such starting materials with each other results in the formation of a net work between the cellulose derivatives, alcohols, phenols and so on being split off from the said esters, ortho-esters or acetals and replaced by the cellulose derivatives. The re-esterification and re-acetalisation reactions described occur only at a higher temperature, so that mixtures containing both types of starting materials can be stored, worked and molded in the usual manner. Thus, lacquer solutions can be built up from starting materials of the character described, if desired, with the addition of softeners, pigments and dyestuffs. Lacquer solutions of the character described can be applied onto any desired surface and, after drying, baked by exposing the coatings to a temperature of above about 150° C. The coatings thus obtained are characterized by their excellent stability towards organic solvents. Furthermore, solutions containing cellulose derivatives of the character described and esters, ortho-esters or acetals of the type referred to above can be employed for preparing threads, foils or bristles according to a dry or wet spinning process, which after having been exposed to a temperature of say above about 150° C. show an improved stability towards solvents and heat. Finally, our new process can be made use of in the preparation of heat-hardening materials which can be employed for the making of molded articles.

As cellulose derivatives which can be employed for the process of our present invention there may be employed partly alkylated, aralkylated or acylated cellulose derivatives such as cellulose, benzylcellulose, cellulose acetate, celluose propionate and mixed esters such as aceto butyrate. Suitable esters and ortho-esters and acetals of the character described are sulfurous acid- bisphenyl ester, oxalic acid-bisphenylester, formic acid-ortho-ethylester, succinic acid-ortho-ethylester, formaldehyde-dibutylacetal, formaldehyde-di($\beta$-chloroethyl)-acetal and acetone-dibutylacetal.

The following examples illustrate the invention without restricting it thereto, the parts being by weight:

Example 1

6 parts of acetylcellulose (54% of acetyl) are dissolved in 24 parts of acetone, 12 parts of toluene and 18 parts of glycol-monomethyletheracetate. 1 part of sulfurous acid-bisphenylester (see "Liebigs Annalen," vol. 485, page 274, 1931) being dissolved in some acetone is added to the solution. The solution thus prepared is applied or sprayed onto a support; after drying the coating is baked by a short heating to 180–190° C. There is obtained an adhesive coating, which is insoluble in acetone.

Example 2

2 parts of oxalic acid-bis-phenylester being dissolved in a mixture of 4 parts of alcohol and 4 parts of glycolmono-methyl-etheracetate is mixed with a solution of 10 parts of acetyl-cellulose of the composition as described in Example 1. The clear lacquer obtained is applied onto a support and, after drying, baked by a short heating to temperatures of about 180–200° C. It is insoluble in organic solvents and shows a good adhesion on its support.

The acetylcellulose can be replaced by a cellulose-acetobutyrate, which still contains free hydroxy groups.

Furthermore, there can be employed softeners of the type of phthalic acid ester.

*Example 3*

12 parts of benzylcellulose (54% of benzyl) are dissolved in a mixture of 66 parts of toluene and 22 parts of tetrahydrofurane. After adding 1.5 parts of oxalic acid-bis-phenylester being dissolved in some tetrahydrofurane, the lacquer is applied onto a support as described in the foregoing examples and then baked. It is not as easily soluble in pyridine as is a common benzylcellulose film.

*Example 4*

In case in Example 1 the sulfurous acid-bis-phenylester is replaced by an equal amount of succinic acid-ortho-ethylester, there is obtained a coating which even at a temperature of 200° C. is stable towards acetone and toluene.

Succinic acid-ortho-ethylester (Bp14mm.=113–116°) can be prepared from succino-bis-imino-ether-chlorohydrate (see "Berichte der deutschen chemischen Gesellschaft," vol. 16, page 361) and alcohol in the cold.

Formic acid-o.ethylester can be used with a similar result.

*Example 5*

6 parts of acetylcellulose are dissolved in 54 parts of glycol monomethyletheracetate. After the addition of 0.03 part of p-toluene-sulfonic acid and 1 part of formaldehyde-di($\beta$-chloroethyl)-acetal, being dissolved in the same solvent, the solution is treated as described in the foregoing examples. There is obtained an adhesive coating, which if contacted with acetone is only swollen.

We claim:

1. The process of producing coatings and shaped articles of cellulosic materials which are stable to heat and organic solvents which comprises forming a solution of a cellulosic compound selected from the class consisting of cellulose and its alkylated, aralkylated and acylated derivatives which still contain hydroxyl groups, and of a non-cellulosic polyfunctional compound selected from the class consisting of polyesters of polybasic organic acids, esters of ortho organic acids and acetals, in a mutual solvent for said cellulosic compound and said polyfunctional compound, shaping said solution, and thereafter heating the same to effect reaction of the cellulosic compound and the polyfunctional compound with the elimination of a substance selected from the class consisting of alcohols and phenols.

2. A composition of matter adapted for the production of coatings and shaped articles of cellulosic compounds which are stable to heat and organic solvents; comprising a solution of a cellulosic compound selected from the class consisting of cellulose and its alkylated, aralkylated and acylated derivatives which still contain hydroxyl groups, and of a non-cellulosic polyfunctional compound selected from the class consisting of polyesters of polybasic organic acids, esters of ortho organic acids and acetals, in a mutual solvent for the cellulosic compound and the polyfunctional compound.

3. The process as claimed in claim 1 wherein the cellulose derivative is acetyl cellulose.

4. The process as claimed in claim 1 wherein an acetyl cellulose containing free hydroxyl groups is heated to a temperature up to about 200° C. with oxalic acid bisphenyl ester.

5. A composition of matter as defined in claim 2 in which the cellulose derivative is acetyl cellulose.

6. A composition of matter as defined in claim 2 in which the cellulosic compound is acetyl cellulose and the polyfunctional compound is oxalic acid bisphenyl ester.

7. A composition of matter as defined in claim 2, in which the cellulosic compound is acetyl cellulose and the polyfunctional compound is succinic acid orthoethyl ester.

8. A composition of matter as defined in claim 2, in which the cellulosic compound is acetyl cellulose and the polyfunctional compound is formaldehyde-di($\beta$-chloro-ethyl)-acetal.

9. The process as claimed in claim 1, wherein an acetyl cellulose, containing free hydroxyl groups, is heated to a temperature up to about 200° C. with succinic acid-ortho-ethyl ester.

10. The process as claimed in claim 1, wherein an acetyl cellulose, containing free hydroxyl groups, is heated to a temperature up to about 200° C. with formaldehyde-di-($\beta$-chloro-ethyl)-acetal.

SIEGFRIED PETERSEN.
KARL TAUBE.